(12) United States Patent
Tanae

(10) Patent No.: US 8,249,132 B2
(45) Date of Patent: Aug. 21, 2012

(54) COMMUNICATION TERMINAL AND RECEIVING METHOD

(75) Inventor: Hiroshi Tanae, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1369 days.

(21) Appl. No.: 11/909,425

(22) PCT Filed: Mar. 3, 2006

(86) PCT No.: PCT/JP2006/304168
§ 371 (c)(1),
(2), (4) Date: Sep. 21, 2007

(87) PCT Pub. No.: WO2006/112179
PCT Pub. Date: Oct. 26, 2006

(65) Prior Publication Data
US 2009/0052504 A1  Feb. 26, 2009

(30) Foreign Application Priority Data
Mar. 30, 2005  (JP) .................... 2005-097988

(51) Int. Cl.
H04B 1/707 (2011.01)
(52) U.S. Cl. ....................... 375/149; 375/147
(58) Field of Classification Search .......... 375/147, 375/148, 149; 455/436, 67.16, 500, 502, 455/11.1, 7, 517, 446, 15, 562.1, 25, 13.4, 455/63.4, 77, 87, 88; 370/350, 329, 315
See application file for complete search history.

(56) References Cited

U.S. PATENT DOCUMENTS

| | | | |
|---|---|---|---|
| 6,137,773 A * | 10/2000 | Stilwell et al. | 370/209 |
| 6,249,682 B1 * | 6/2001 | Kubo et al. | 455/522 |
| 6,507,571 B1 | 1/2003 | Yamamoto | |
| 6,549,545 B1 | 4/2003 | Yamamoto et al. | |
| 2001/0006515 A1 * | 7/2001 | Lee et al. | 370/331 |
| 2001/0021179 A1 * | 9/2001 | Tiedemann et al. | 370/333 |
| 2002/0054585 A1 | 5/2002 | Hanada et al. | |

(Continued)

FOREIGN PATENT DOCUMENTS

CN  1219091  6/1999

(Continued)

OTHER PUBLICATIONS

Mostafa M. El-Said, Anup Kumar and Adel S.Elmaghraby, "Pilot pollution interference reduction using multi-carrier interferometry", University of Louisville, IEEE, 2003.*

(Continued)

Primary Examiner — Aristocratis Fotakis
(74) Attorney, Agent, or Firm — Dickinson Wright PLLC

(57) ABSTRACT

A communication terminal in which a circuit component can measure active sets thereby to reduce the circuit scale. In the terminal, a synchronization base station switch (105) outputs a switching timing signal so that frequency shift information, reception timing information, and scramble code information on a base station where the received signals of the base stations are despread are outputted at the despreading timing. A scramble code reception timing detecting circuit (106) detects the reception timing of a pilot signal. A scramble code identifying circuit (107) detects a scramble code. A scramble code reception timing memory (110) stores the reception timing information for each base station. A scramble code memory (111) stores the scramble code information for each base station. A demodulating circuit (112) demodulates the received signal according to the reception timing information and the scramble code information.

2 Claims, 13 Drawing Sheets

U.S. PATENT DOCUMENTS

| | | | |
|---|---|---|---|
| 2003/0021334 A1* | 1/2003 | Levin et al. | 375/147 |
| 2003/0054828 A1* | 3/2003 | Dent | 455/450 |
| 2003/0179737 A1* | 9/2003 | Dor et al. | 370/342 |
| 2003/0214917 A1* | 11/2003 | Molisch et al. | 370/286 |
| 2005/0163238 A1 | 7/2005 | Fujii | |
| 2005/0249180 A1 | 11/2005 | Murakami et al. | |
| 2009/0175228 A1* | 7/2009 | Kimura et al. | 370/329 |

FOREIGN PATENT DOCUMENTS

| | | |
|---|---|---|
| JP | 10126331 | 5/1998 |
| JP | 11027180 | 1/1999 |
| JP | 11284548 | 10/1999 |
| JP | 2002101445 | 4/2002 |
| JP | 2003152681 | 5/2003 |
| JP | 2004032124 | 1/2004 |
| JP | 2004120730 | 4/2004 |
| WO | 2004021616 | 3/2004 |

OTHER PUBLICATIONS

Chinese Office Action dated Mar. 29, 2010.

PCT International Search Report dated Jun. 6, 2006.

* cited by examiner

COMMUNICATION TERMINAL AND RECEIVING METHOD

TECHNICAL FIELD

The present invention relates to a communication terminal apparatus, base station apparatus and reception method. More particularly, the present invention relates to a communication terminal apparatus, base station apparatus and reception method in a 1-frequency iteration cellular system using OFCDM (Orthogonal Frequency and Code Division Multiplexing) in downlink.

BACKGROUND ART

In the conventional mobile cellular communication systems, when OFDM (Orthogonal Frequency Division Multiplexing) using spreading codes, that is, a 1-frequency iteration cellular system based on OFCDM is realized, a technique of reducing the amount of interference by converting radio waves from cells to noise using scrambling codes and separating a signal through despreading on the receiving side, is known (for example, Patent Document 1). Further, in a mobile cellular system where a cell of a base station apparatus has a finite radius, a mobile station needs to sequentially switch base stations as the mobile station moves, so that the mobile station requires a means for knowing base station apparatuses of switching candidates. Therefore, the mobile station uses, for example, a method of having a base station apparatus within its communication area report information of another base station apparatus around the mobile station as report information, and thereby knows peripheral base station apparatuses of the switching candidates. The mobile station then actually receives radio waves of the base station apparatuses of the switching candidates and measures a radio wave channel condition, and thereby determines whether or not it is possible to perform handover to the base stations of the switching candidates. In this way, to smoothly realize handover around a cell boundary, the mobile station measures in advance the reception condition of a base station apparatus predicted to be a handover destination (hereinafter, described as an "active set").

A cellular system uses a code spreading scheme (CDMA) whereby in each cell, the transmitting side performs spreading processing and the receiving side performs despreading processing using spreading codes. When a code spreading scheme is used, even when an identical frequency is used between cells, signals between cells can keep orthogonality, so that identical frequency can be repeatedly used between cells. Such a system is called a "1-frequency iteration cellular system."

Furthermore, according to a multicarrier transmission scheme such as an OFDM modulation scheme, the transmitting side modulates an information signal using a plurality of subcarriers and inserts a guard interval in the transmission signal for the purpose of reducing waveform distortion due to multipath delay waves.

Further, in mobile communication, frequency differences are produced due to a Doppler frequency according to movement speeds between base station apparatuses and a mobile station. In addition, the Doppler frequency varies between one mobile station and each base station apparatus. When a relative speed between the base station apparatuses and the mobile station is V, the speed of light is C and a communication carrier frequency is f0, Doppler frequency fd can be calculated as fd=(V×f0)/C. When, for example, the relative speed is 300 km/h in a 4-GHz carrier wave, the frequency difference due to the Doppler frequency becomes a value exceeding 1 kHz. As for a relative speed between two base station apparatuses and a mobile station, when the relative speed between one base station apparatus and the mobile station is +300 km/h and the relative speed between the other base station apparatus and the mobile station is −300 km/h, a frequency difference of 2 kHz or more is produced in received radio waves at the mobile station from the two base station apparatuses.

Further, when an OFDM reception apparatus performs a discrete Fourier transform, if the frequency varies, the orthogonality is lost, and the demodulation accuracy degrades. Consequently, by acquiring a desired cell frequency at an RF section of the OFDM reception apparatus, the OFDM reception apparatus needs to correct the frequency difference in the received radio waves including a Doppler frequency or the like produced between the base station apparatuses and the mobile station. Furthermore, a circuit for detecting reception timing of a scrambling code at the mobile station sets FFT (fast Fourier transform) timing per pilot signal of each active set and detects a reception timing of each pilot signal. In this case, when one circuit detects reception timings of pilot signals of all active sets and the pilot signals of the active sets which overlap with each other in time are received, if a frequency difference of one active set is corrected, a frequency difference of another active set having a different frequency difference cannot be corrected with the corrected frequency. As a result, reception timings of pilot signals of another active set are not detected correctly. This is because the pilot signals of another active set are subjected to FFT with a shifted frequency and the orthogonality is lost. Therefore, when an OFCDM 1-frequency iteration cellular system is realized, measurement of an active set requires a frequency acquisition circuit on a per active set basis and an FFT circuit for detecting a synchronization timing. Here, the "scrambling code" is a long-period spreading code and is a code which varies for each cell, and scrambling codes are orthogonal to each other among the cells.

In an actual third-generation mobile communication cellular system, a mobile station measures SIRs of received signals of eight active sets at a maximum. In a cellular system using OFCDM, when the mobile station is required to receive synchronization signals from a plurality of active sets as in the case of the third-generation mobile communication cellular system, the mobile station needs to be provided with a plurality of sets of frequency acquisition circuits to demodulation circuits in parallel.

Patent Document 1: Japanese Patent Application Laid-Open No. 2003-152681

DISCLOSURE OF INVENTION

Problems to be Solved by the Invention

However, the conventional apparatus requires a plurality of local oscillators for frequency acquisition, A/D converters and FFT circuits to receive synchronization signals of active sets, and therefore there is a problem that the circuit scale increases.

It is therefore an object of the present invention to provide a communication terminal apparatus, base station apparatus and reception method that make it possible to reduce a circuit scale by measuring a plurality of active sets using one circuit part.

Means for Solving the Problem

The communication terminal apparatus of the present invention adopts a configuration including: a reception section that receives signals which are transmitted from a plurality of base station apparatuses and multiplied by a scrambling code specific to each base station apparatus, and receives, at different timings, pilot signals included in the signals transmitted from the base station apparatuses at timings not overlapping with each other; a reception synchronizing section that detects reception timings of the pilot signals of the base station apparatuses received by the reception section at the different timings and the scrambling codes; a storage section that stores the reception timings and the scrambling codes detected at the reception synchronizing section per base station apparatus; a demodulation section that performs despreading processing on the signals of the base station apparatuses received by the reception section based on the reception timings and the scrambling codes stored in the storage section and then demodulates the signals; and a switching section that switches between outputs so that the reception timings and the scrambling codes of the base station apparatuses to be subjected to despreading processing stored in the storage section are outputted to the demodulation section at timings at which the demodulation section performs despreading processing on the signals of the base station apparatuses.

The base station apparatus of the present invention adopts a configuration including: a pilot scheduler section that sets transmission timings of pilot signals so that the pilot signals are transmitted at timings at which the pilot signals do not overlap with pilot signals transmitted from another station; a multiplication section that multiplies a transmission signal including the pilot signals for which the transmission timings are set by the pilot scheduler section by a scrambling code specific to each station; and a transmission section that transmits the transmission signal multiplied by the scrambling code by the multiplication section so that the pilot signals are transmitted at the transmission timings set by the pilot scheduler section.

The reception method of the present invention includes the steps of: multiplying a signal including pilot signals by a scrambling code specific to each base station apparatus; setting transmission timings of the pilot signals so that the pilot signals transmitted from the base station apparatuses are transmitted at timings at which the pilot signals do not overlap with each other; transmitting from the base station apparatuses the signal including the pilot signals multiplied by the scrambling codes so that the pilot signals are transmitted at the set transmission timings; receiving at a communication terminal apparatus the signal including the pilot signals and receiving the pilot signals transmitted from the base station apparatuses at different timings; detecting reception timings of the pilot signals received at different timings and the scrambling codes per base station apparatus; storing the detected reception timings and the scrambling codes per base station apparatus; selecting the reception timings and the scrambling code of the base station apparatus to be demodulated out of the stored reception timings and the scrambling codes; and performing despreading processing on the signal including the received pilot signals based on the selected reception timings and the scrambling code per base station apparatus and then demodulating the signal.

Advantageous Effect of the Invention

According to the present invention, it is possible to measure a plurality of active sets at one circuit part and thereby reduce the circuit scale.

BEST MODE FOR CARRYING OUT THE INVENTION

Embodiments of the present invention will be described below in detail with reference to the accompanying drawings.

Embodiment 1

Figure 1:
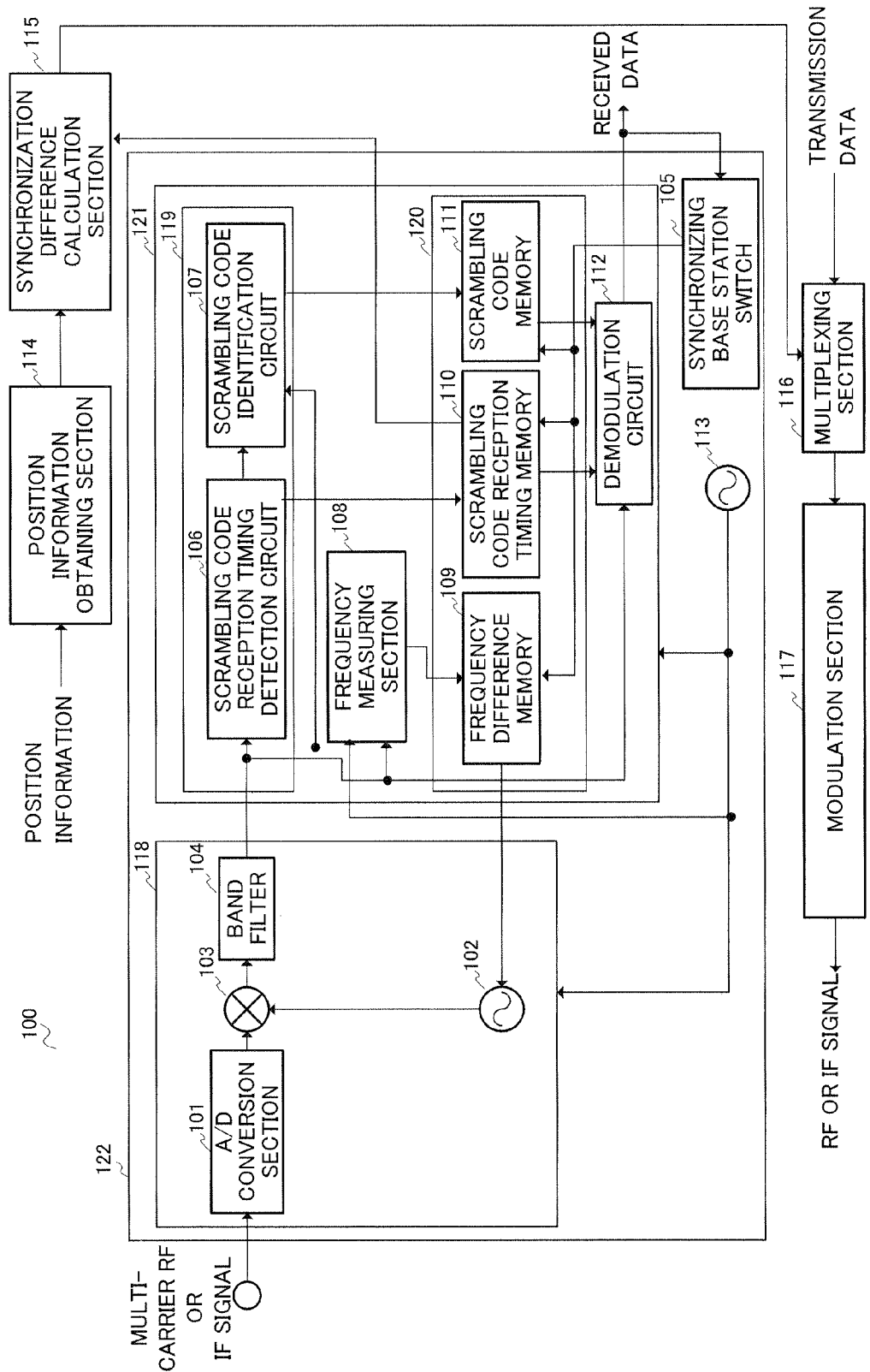
FIG. 1 is a block diagram showing the configuration of the communication terminal apparatus according to Embodiment 1 of the present invention.

FIG. 1 is a block diagram showing the configuration of communication terminal apparatus 100 according to Embodiment 1 of the present invention. A/D conversion section 101, local oscillator 102, multiplier 103 and band filter 104 configure frequency conversion block 118 (receiving section) which is a down-converter. Further, scrambling code reception timing detection circuit 106 and scrambling code identification circuit 107 configure reception synchronizing section 119. Frequency difference memory 109, scrambling code reception timing memory 110 and scrambling code memory 111 configure memory switching section 120. Reception synchronizing section 119, frequency measuring section 108, demodulation circuit 112 and memory switching section 120 configure demodulation block 121. Synchronizing base station switch 105, local oscillator 113, frequency conversion block 118 and demodulation block 121 configure reception apparatus 122.

A/D conversion section 101 converts the inputted received signal from an analog signal to a digital signal and outputs the digital signal to multiplier 103. Here, the received signal inputted to A/D conversion section 101 is received by an antenna (not shown) and is a multicarrier high frequency (hereinafter, described as "RF") signal or a multicarrier intermediate frequency (hereinafter, described as "IF") signal.

Local oscillator 102 is a numerically controlled oscillator (NCO) using a direct digital synthesizer (DDS) for example. To acquire a frequency of a target cell, local oscillator 102 generates a signal of a predetermined frequency and outputs the signal to multiplier 103 based on the frequency difference information of a frequency difference inputted from frequency difference memory 109 in a later stage. Although the actual received signal is a signal where frequency difference fd due to a Doppler frequency and the like is produced in multicarrier input frequency expected value fc, local oscillator 102 generates a signal of a frequency which corrects frequency difference fd of the actual received signal so that the frequency of the actual received signal is in synchronization with the multicarrier input frequency expected value fc.

Multiplier 103 multiplies the received signal inputted from A/D conversion section 101 by the signal inputted from local oscillator 102, corrects the frequency difference caused by the Doppler frequency and the like, and outputs the signal to band filter 104.

Band filter 104 is provided for passing only a predetermined band of the received signal inputted from multiplier 103 and outputs the passed received signal of the predetermined band to scrambling code reception timing detection circuit 106, scrambling code identification circuit 107, frequency measuring section 108 and demodulation circuit 112.

Synchronizing base station switch 105 which is a switching section extracts the information of scrambling codes of the base station apparatuses and the information of the transmission timings of pilot signals of the base station apparatuses from the report information of the base station apparatuses included in the received signal inputted from demodulation circuit 112. Synchronizing base station switch 105 then duplicates a transmission pattern of the pilot signals of the base station apparatuses using the information of the extracted transmission timings and stores the transmission pattern. In addition, synchronizing base station switch 105 outputs an output instruction signal to scrambling code memory 111 so as to output to demodulation circuit 112 scrambling codes corresponding to the received signals of the base station apparatuses which are demodulated by demodulation circuit 112, based on the extracted scrambling code information of the base station apparatuses. Furthermore, synchronizing base station switch 105 estimates the timings at which the received signals of the base station apparatuses are subjected to despreading processing using the scrambling codes from the stored transmission pattern of the pilot signals of the base station apparatuses and outputs the switching timing signals to frequency difference memory 109, scrambling code reception timing memory 110 and scrambling code memory 111 so that the frequency difference information, the reception timing information and the scrambling code information of the base station apparatuses to be subjected to despreading processing are outputted at the estimated despreading processing timings.

Scrambling code reception timing detection circuit 106 detects the reception timings of the pilot signals of the base station apparatuses from the received signals inputted from band filter 104. Scrambling code reception timing detection circuit 106 then outputs the reception timing information that is information of the detected reception timings of the pilot signals of the base station apparatuses, to scrambling code identification circuit 107 and scrambling code reception timing memory 110. By repeating the processing, scrambling code reception timing detection circuit 106 makes it possible to converge the reception timings to an optimal reception timing. Details of the configuration of scrambling code reception timing detection circuit 106 will be described later.

Scrambling code identification circuit 107 detects the scrambling codes of the base station apparatuses from the received signals inputted from band filter 104 and the reception timing information inputted from scrambling code reception timing detection circuit 106. Scrambling code identification circuit 107 then outputs the scrambling code information which is the information of the detected scrambling codes of the base station apparatuses to scrambling code memory 111. By repeating the processing, scrambling code identification circuit 107 makes it possible to converge the scrambling codes to an optimal scrambling code. Details of the configuration of scrambling code identification circuit 107 will be described later.

Frequency measuring section 108 measures frequencies of the received signals inputted from band filter 104. Frequency measuring section 108 then compares the measured frequencies with a reference frequency inputted from local oscillator 113 and detects frequency difference fd which is a difference between the measured frequencies and the reference frequency. Frequency measuring section 108 then outputs the information of detected frequency difference fd to frequency difference memory 109 as the frequency difference information.

Frequency difference memory 109 stores the frequency difference information of frequency difference fd inputted from frequency measuring section 108 per base station apparatus. Frequency difference memory 109 then outputs to local oscillator 102 the frequency difference information of the base station apparatus indicated by the switching timing signal inputted from synchronizing base station switch 105 out of the stored frequency difference information.

Scrambling code reception timing memory 110, which is a storage section, stores the reception timing information of the pilot signals inputted from scrambling code reception timing detection circuit 106 per base station apparatus. Scrambling code reception timing memory 110 then outputs to demodulation circuit 112 the scrambling code reception timing information of the base station apparatus indicated by the switching timing signal inputted from synchronizing base station switch 105 out of the stored reception timing information. Further, scrambling code reception timing memory 110 outputs the stored reception timing information to synchronization difference calculation section 115 at a predetermined timing.

Scrambling code memory 111, which is a storage section, stores the scrambling code information inputted from scrambling code identification circuit 107 per base station apparatus. Scrambling code memory 111 then outputs to demodulation circuit 112 the scrambling code information of the base station apparatus indicated by the switching timing signal inputted from synchronizing base station switch 105 out of the stored scrambling code information.

Based on the reception timing information inputted from scrambling code reception timing memory 110 and the scrambling code information inputted from scrambling code memory 111, demodulation circuit 112, which is a demodulation section, demodulates the received signal inputted from band filter 104. To be more specific, demodulation circuit 112 removes a guard interval (hereinafter, described as "GI") period from the received signal inputted from band filter 104 and carries out an FFT calculation. Demodulation circuit 112 then performs despreading processing using the scrambling code of the scrambling code information inputted from scrambling code memory 111 at the timing of the reception timing information inputted from scrambling code reception timing memory 110. Moreover, demodulation circuit 112 performs despreading processing on the received signal using a short-period spreading code of known patterns stored in advance, converts the received signal subjected to the despreading processing from a parallel data format to a serial data format, demodulates and decodes the converted signal. Demodulation circuit 112 then outputs the received signal after demodulation and decoding to synchronizing base station switch 105 and outputs the signal as the received data.

Local oscillator 113 generates a signal of the reference frequency and outputs the signal to frequency measuring section 108. Furthermore, local oscillator 113 outputs the signal of a frequency which is an overall reference of conversion block 118 and demodulation block 121 to frequency conversion block 118 and demodulation block 121.

Position information obtaining section 114 obtains position information of the communication terminal apparatus measured by a GPS and outputs the obtained position information to synchronization difference calculation section 115.

Based on the reception timing information of pilot signals of the base station apparatuses inputted from scrambling code reception timing memory 110, the position information inputted from position information obtaining section 114, the position information of the base station apparatuses stored in advance and the speed of the radio waves, synchronization difference calculation section 115 calculates a synchronization difference that is an error of the reception timing difference of pilot signals between the base station apparatuses with respect to a reference value. Synchronization difference calculation section 115 then outputs the calculated synchronization difference information to multiplexing section 116. Details of the method of calculating a synchronization difference will be described later.

Multiplexing section 116 multiplexes transmission data and the synchronization difference information inputted from synchronization difference calculation section 115 and outputs the multiplexing result to modulation section 117.

Modulation section 117 modulates the signal inputted from multiplexing section 116 where the synchronization difference information and the transmission data are multiplexed, and outputs the modulated signal as an RF signal or an IF signal. The RF signal or the IF signal outputted from modulation section 117 is transmitted from an antenna (not shown). Multiplexing section 116 and modulation section 117 are reporting sections that report the synchronization difference information to the base station apparatus.

Figure 2:
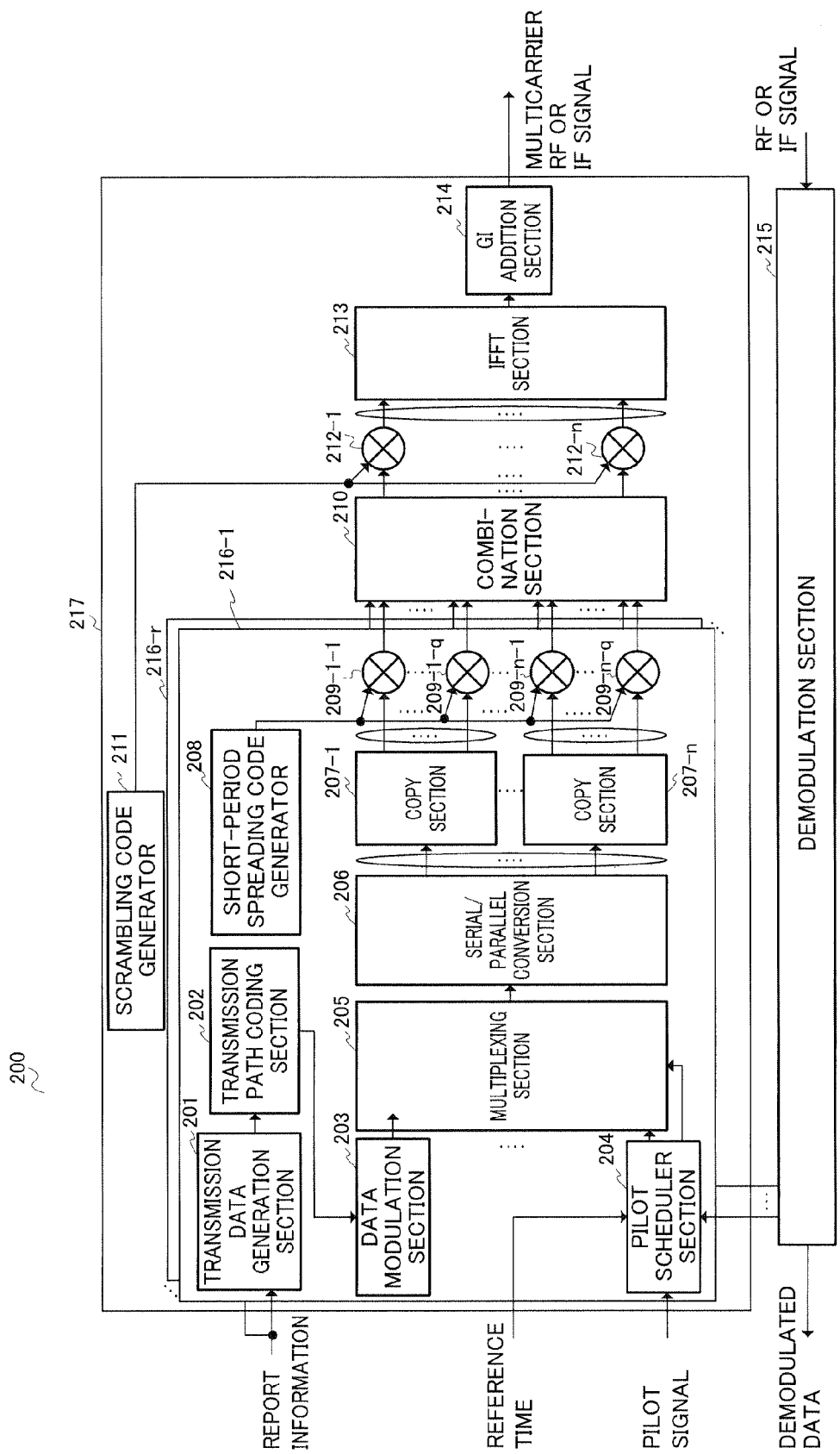
FIG. 2 is a block diagram showing the configuration of the base station apparatus according to Embodiment 1 of the present invention.

Next, the configuration of base station apparatus 200 will be explained with reference to FIG. 2. FIG. 2 is a block diagram showing the configuration of base station apparatus 200. Transmission data generation section 201, transmission path coding section 202, data modulation section 203, pilot scheduler section 204, multiplexing section 205, serial/parallel conversion section 206, copy sections 207-1 to 207-$n$ (n is the number of subcarriers), short-period spreading code generator 208 and multipliers 209-1-1 to 209-$n$-$q$ (q is an arbitrary natural number) configure signal processing blocks 216-1 to 216-$r$ (r is an arbitrary natural number). Furthermore, combination section 210, scrambling code generator 211, multipliers 212-1 to 212-$n$, IFFT section 213, GI addition section 214 and signal processing blocks 216-1 to 216-$r$ configure transmission apparatus 217.

Transmission data generation section 201 generates transmission data including report information and outputs the transmission data to transmission path coding section 202. The report information includes information of the scrambling codes used by base station apparatus 200 and information of the transmission timings of the pilot signals at base station apparatus 200.

Transmission path coding section 202 encodes the transmission data inputted from transmission data generation section 201 and outputs the encoded transmission data to data modulation section 203.

Data modulation section 203 modulates the transmission data inputted from transmission path coding section 202 and outputs the modulated transmission data to multiplexing section 205.

Pilot scheduler section 204 stores transmission timings of pilot signals of another base station apparatus. Based on the stored transmission timings of pilot signals of another base station apparatus and a reference time, pilot scheduler section 204 sets the transmission timings of pilot signals of the base station so as not to overlap with the transmission timings of pilot signals at another base station apparatus. Pilot scheduler section 204 then instructs multiplexing section 205 to perform output so that the pilot signals are transmitted at the set transmission timings of the pilot signals. Furthermore, pilot scheduler section 204 corrects a synchronization difference of the pilot signals with respect to another base station apparatus based on the synchronization difference information inputted from demodulation section 215. The method of setting the transmission timings of the pilot signals will be described later.

Multiplexing section 205 multiplexes the pilot signals and the transmission data according to the instruction from pilot scheduler section 204 and outputs the multiplexed data to serial/parallel conversion section 206.

Serial/parallel conversion section 206 converts the multiplexed data inputted from multiplexing section 205 from a serial data format to a parallel data format and outputs the parallel data to copy sections 207-1 to 207-$n$.

Copy sections 207-1 to 207-$n$ duplicate the data inputted from serial/parallel conversion section 206 and outputs the duplicated data to multipliers 209-1-1 to 209-$n$-$q$.

Short-period spreading code generator 208 generates short-period spreading codes and outputs the spreading codes to multipliers 209-1-1 to 209-$n$-$q$.

Multipliers 209-1-1 to 209-$n$-$q$ multiply the data inputted from copy sections 207-1 to 207-$n$ by the short-period spreading codes inputted from short-period spreading code generator 208, performs spreading processing on the spreading codes and outputs the data after the spreading processing to combination section 210.

Combination section 210 combines the data after the spreading processing inputted from multipliers 209-1-1 to 209-$n$-$q$ of signal processing blocks 216-1 to 216-$m$ and outputs the combined data to multipliers 212-1 to 212-$n$.

Scrambling code generator 211 generates a scrambling code specific to each base station apparatus and outputs the generated scrambling code to multipliers 212-1 to 212-$n$.

Multipliers 212-1 to 212-$n$ multiply the data inputted from combination section 210 by the scrambling codes inputted from scrambling code generator 211 and outputs the multiplication results to IFFT section 213.

IFFT section 213 applies IFFT (inverse fast Fourier transform) processing to the data inputted from multipliers 212-1 to 212-$n$ and outputs the data to GI addition section 214.

GI addition section 214 adds a GI period to the data inputted from IFFT section 213 and outputs the data. The transmission signal outputted from GI addition section 214 is subjected to a frequency conversion by a frequency conversion section (transmission section) which is an up-converter (not shown) and transmitted as a multicarrier high frequency (RF) signal or an intermediate frequency (IF) signal via an antenna (not shown).

Demodulation section 215 extracts the synchronization difference information included in the received signal by demodulating the high frequency (RF) signal or the intermediate frequency (IF) signal received through the antenna (not shown). Demodulation section 215 then outputs the extracted synchronization difference information to pilot scheduler section 204 and outputs the demodulated data after the demodulation.

Figure 3:
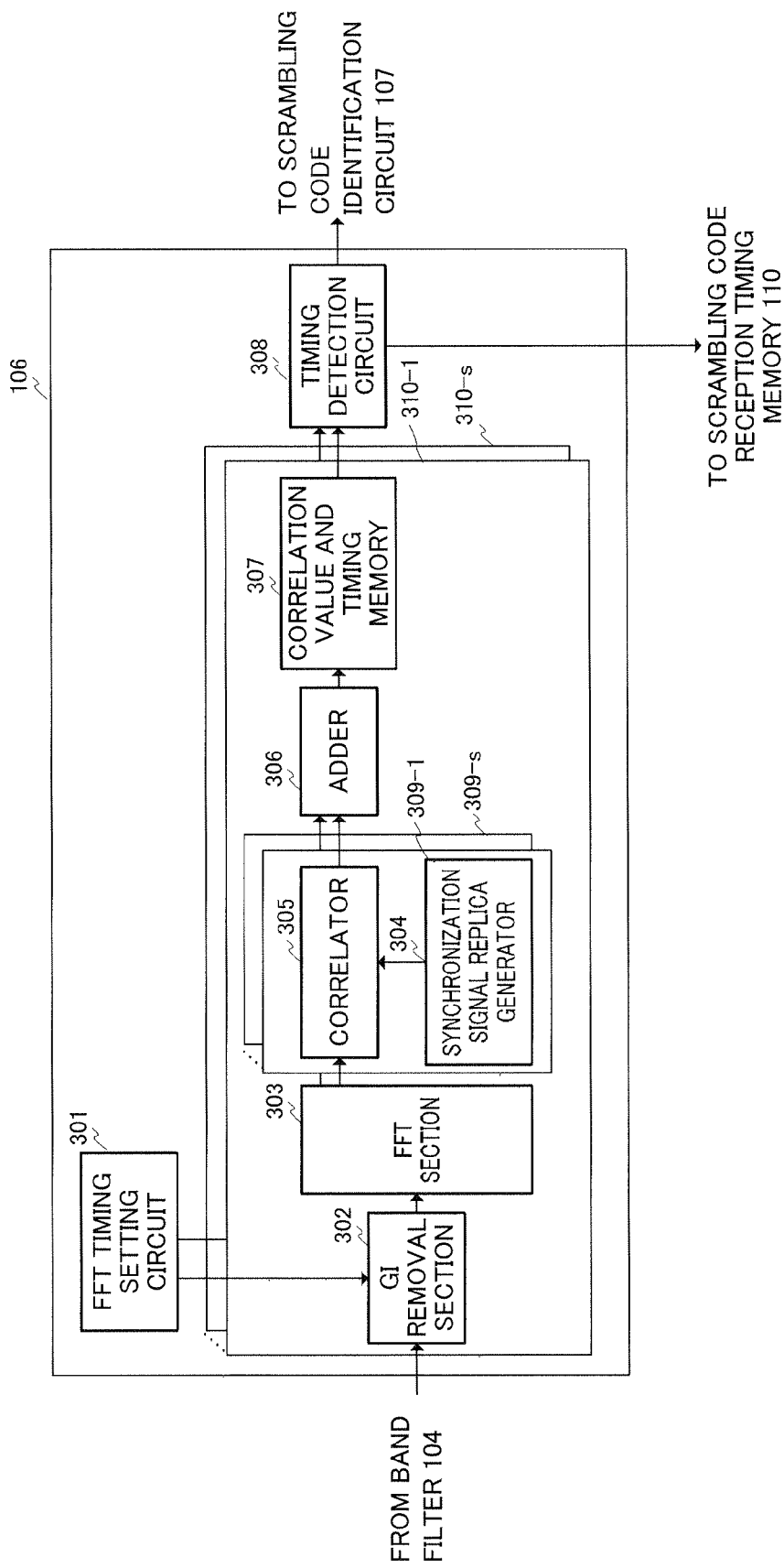
FIG. 3 is a block diagram showing the configuration of the scrambling code reception timing detection circuit according to Embodiment 1 of the present invention.

Next, details of the configuration of scrambling code reception timing detection circuit 106 will be explained using FIG. 3. FIG. 3 is a block diagram showing the configuration of scrambling code reception timing detection circuit 106. Synchronization signal replica generator 304 and correlator 305 configure correlation calculation blocks 309-1 to **309-*s*** (*s* is an arbitrary natural number). Furthermore, GI removal section 302, FFT section 303, adder 306, correlation value and timing memory 307 and correlation calculation blocks 309-1 to **309-*s* configure synchronization signal correlation detection circuits 310-1 to 310-*s*. The same number of correlation calculation blocks 309-1 to 309-*s* as the number of subcarriers with which synchronization channels are multiplexed, are provided. Further, synchronization signal correlation detection circuits 310-1 to 310-*s* are provided on a per FFT timing basis which is set by FFT timing setting circuit 301**.

FFT timing setting circuit 301 sets the preset FFT timings and outputs the FFT timing information which is information of the set FFT timings, to GI removal section 302.

GI removal section 302 removes the GI period included in the received signal inputted from band filter 104 at the FFT timing of the FFT timing information inputted from FFT timing setting circuit 301. GI removal section 302 then outputs the received signal where the GI period is removed, to FFT section 303.

FFT section 303 performs an FFT calculation on the inside of the FFT window of the received signal inputted from GI removal section 302. FFT section 303 then outputs the result of the FFT calculation of symbols where pilot signals are inserted to correlator 305.

Synchronization signal replica generator 304 generates the synchronization signal in a known pattern included in the pilot signal and outputs the generated synchronization signal to correlator 305.

Correlator 305 performs correlation calculations between the FFT calculation result inputted from FFT section 303 and the synchronization signal inputted from synchronization signal replica generator 304. Correlator 305 then outputs the correlation calculation results to adder 306.

Adder 306 adds the correlation calculation results inputted from correlator 305 and outputs the addition result to correlation value and timing memory 307.

Correlation value and timing memory 307 stores the addition result of the correlation calculation results inputted from adder 306. Correlation value and timing memory 307 then outputs the addition result selected by timing detection circuit 308 out of the addition results of the stored correlation calculation results to timing detection circuit 308.

Timing detection circuit 308 detects the timing of the maximum correlation value obtained from the addition results of the correlation calculation results stored in correlation value and timing memory 307 as the reception timing of a pilot signal. Timing detection circuit 308 then outputs the reception timing information which is information of the detected reception timing to scrambling code identification circuit 107 and scrambling code reception timing memory 110. In this case, timing detection circuit 308 detects the reception timings per base station apparatus and outputs the reception timing information for each base station apparatus to scrambling code identification circuit 107 and scrambling code reception timing memory 110.

Figure 4:
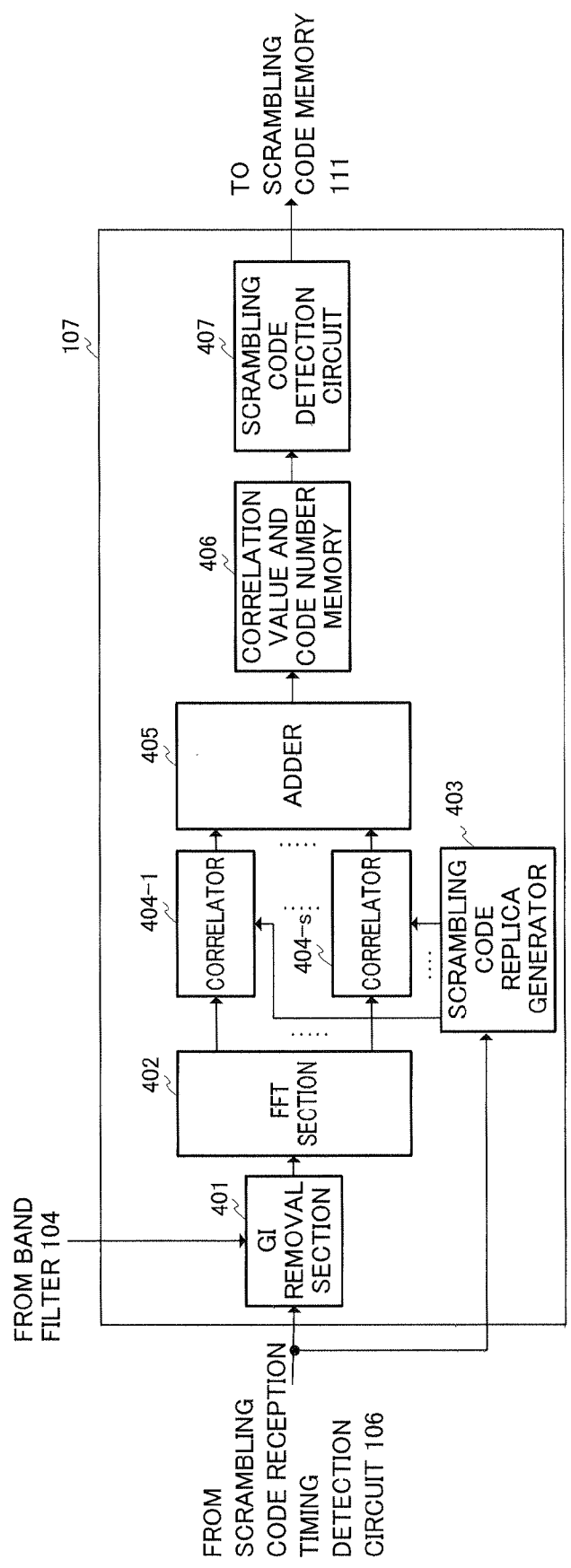
FIG. 4 is a block diagram showing the configuration of the scrambling code identification circuit according to Embodiment 1 of the present invention.

Next, details of the configuration of scrambling code identification circuit 107 will be explained using FIG. 4. FIG. 4 is a block diagram showing the configuration of scrambling code identification circuit 107.

GI removal section 401 removes the GI period included in the received signal inputted from band filter 104 at the reception timing of the reception timing information inputted from scrambling code reception timing detection circuit 106 and outputs the received signal to FFT section 402.

FFT section 402 performs an FFT calculation on the inside of the FFT window of the received signal inputted from GI removal section 401. FFT section 402 then outputs the FFT calculation result to correlators 404-1 to **404-*s***.

Scrambling code replica generator 403 generates scrambling codes which are known patterns of the base station apparatuses at the reception timing of the reception timing information inputted from scrambling code reception timing detection circuit 106 and outputs the generated scrambling codes to correlators 404-1 to **404-*s***.

Correlators 404-1 to **404-*s* each perform a correlation calculation between the FFT calculation result inputted from FFT section 402 and the scrambling codes inputted from scrambling code replica generator 403. Correlators 404-1 to 404-*s* then output the correlation calculation results to adder 405**.

Adder 405 adds the correlation calculation results inputted from correlators 401-1 to **404-*n* and outputs the addition result to correlation value and code number memory 406**.

Correlation value and code number memory 406 stores the addition result of the correlation calculation results inputted from adder 405. Correlation value and code number memory 406 then outputs the addition result selected by scrambling code detection circuit 407 out of the stored addition results of the correlation calculation results to scrambling code detection circuit 407.

Scrambling code detection circuit 407 selects a scrambling code for which a maximum correlation value is obtained, from the addition results of the correlation calculation results stored in correlation value and code number memory 406. Scrambling code detection circuit 407 then outputs the scrambling code information which is information of the selected scrambling code to scrambling code memory 111. In this case, scrambling code detection circuit 407 detects a scrambling code per base station apparatus and outputs the scrambling code for each base station apparatus to scrambling code memory 111.

Next, the operations of communication terminal apparatus 100 and base station apparatus 200 will be explained.

Figure 5:
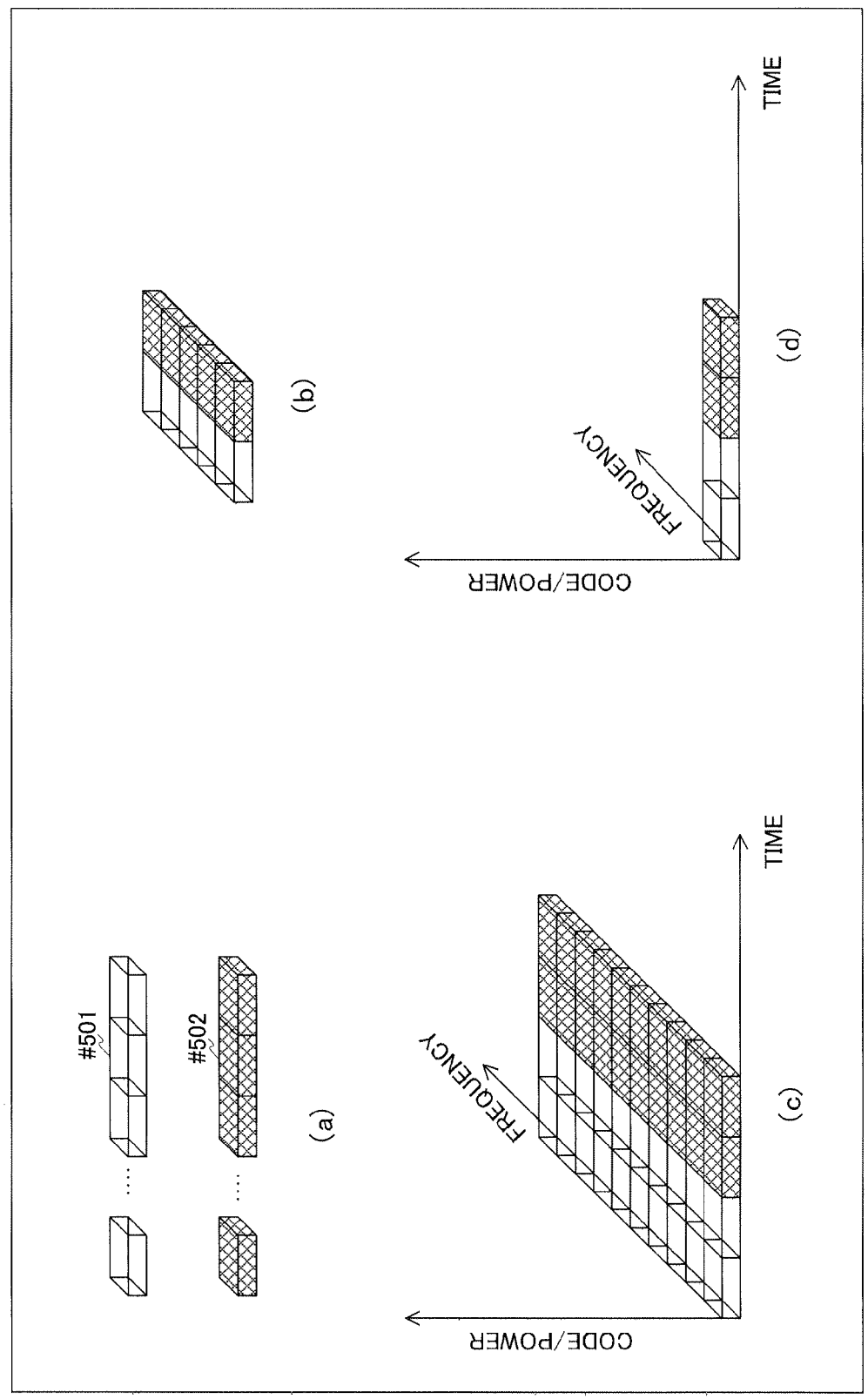
FIG. 5 illustrates the operations of the base station apparatus according to Embodiment 1 of the present invention.

As shown in FIG. 5(*a*), transmission data #501 outputted in a serial data format from transmission data generation section 201 is encoded by transmission path coding section 202 and then modulated by data modulation section 203 and inputted to multiplexing section 205. On the other hand, pilot scheduler section 204 inputs pilot signal #502 outputted in a serial data format, to multiplexing section 205. Furthermore, pilot scheduler section 204 sets transmission timings of the pilot signals.

Figure 6:
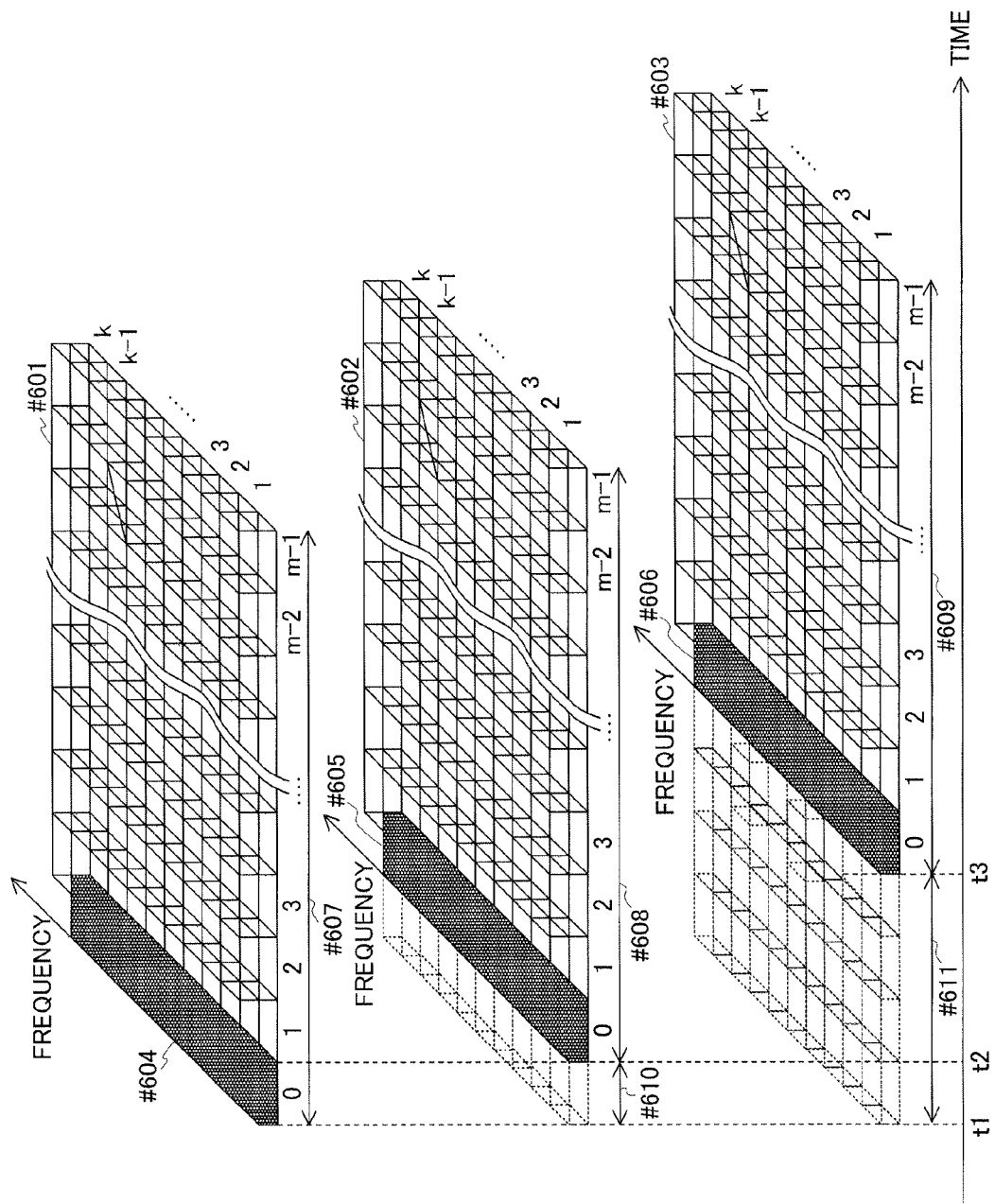
FIG. 6 shows the transmission timings of pilot signals according to Embodiment 1 of the present invention.

FIG. 6 shows an example of the transmission timings of pilot signals set by pilot scheduler section 204. In FIG. 6, the horizontal axis shows a time domain, and the vertical axis shows a frequency domain. In FIG. 6, transmission signal #601 is transmitted from base station apparatus 200-1, transmission signal #602 is transmitted from base station apparatus 200-2, and transmission signal #603 is transmitted from base station apparatus 200-p (p is an arbitrary natural number greater than 2). Base station apparatuses 200-1, 200-2 and 200-p are different base station apparatuses and have the same configuration as that in FIG. 2. Pilot signal #604 is inserted in the leading symbol of 1 radio frame #607 of transmission signal #601, pilot signal #605 is inserted in the leading symbol of 1 radio frame #608 of transmission signal #602, and pilot signal #606 is inserted in the leading symbol of 1 radio frame #609 of transmission signal #603. In addition, 1 radio frames #607, #608 and #609 are comprised of m symbols from "0" to "m−1", and symbol 0 is a leading symbol. Further, in transmission signals #601, #602 and #603, k subcarriers that have subcarrier numbers from "1" to "k" are arranged in the frequency domain.

Pilot scheduler section 204 of base station apparatus 200-1 starts transmission of the transmission signal at time t1. In this way, pilot signal #604 is transmitted at time t1. Further, pilot scheduler section 204 of base station apparatus 200-2 starts transmission of a transmission signal at time t2. In this way, pilot signal #605 is transmitted at time t2. Here, the time passed from time t1 to time t2 is 1-symbol time #610. Furthermore, pilot scheduler section 204 of base station apparatus 200-p starts transmission of the transmission signal at time t3. In this way, pilot signal #606 is transmitted at time t3. Here, the time that has passed from time t1 to time t3 is time #611 which is equal to or more than 2 symbols and less than m symbols.

Next, multiplexing section 205 multiplexes the pilot signals and the transmission data so that the pilot signal is inserted in the leading symbol of each frame of the transmission signal and generates a transmission signal. Multiplexing section 205 multiplexes the pilot signals and the transmission data, generates and outputs the transmission signal so as to be transmitted at the timing set by pilot scheduler section 204 as shown in FIG. 6.

Next, as shown in FIG. 5(b), serial/parallel conversion section 206 converts the transmission signal from a serial data format to a parallel data format. Next, the transmission signal is duplicated at copy sections 207-1 to 207-n, and multiplied by short-period spreading codes at multipliers 209-1-1 to 209-n-q, and thereby the results are subjected to spreading processing. FIG. 5(c) shows the transmission signal subjected to the spreading processing.

Next, the transmission signal subjected to the spreading processing is combined at combination section 210, multiplied by scrambling code at multipliers 212-1 to 212-n and subjected to IFFT processing at IFFT section 213. GI addition section 214 adds a GI period to the transmission signal subjected to the IFFT processing. FIG. 5(d) shows the transmission signal which is subjected to IFFT processing and to which the GI period is added, and the transmission data and pilot signals are arranged in series in the time domain. Next, base station apparatus 200 transmits the transmission signal shown in FIG. 5(d).

Figure 7:
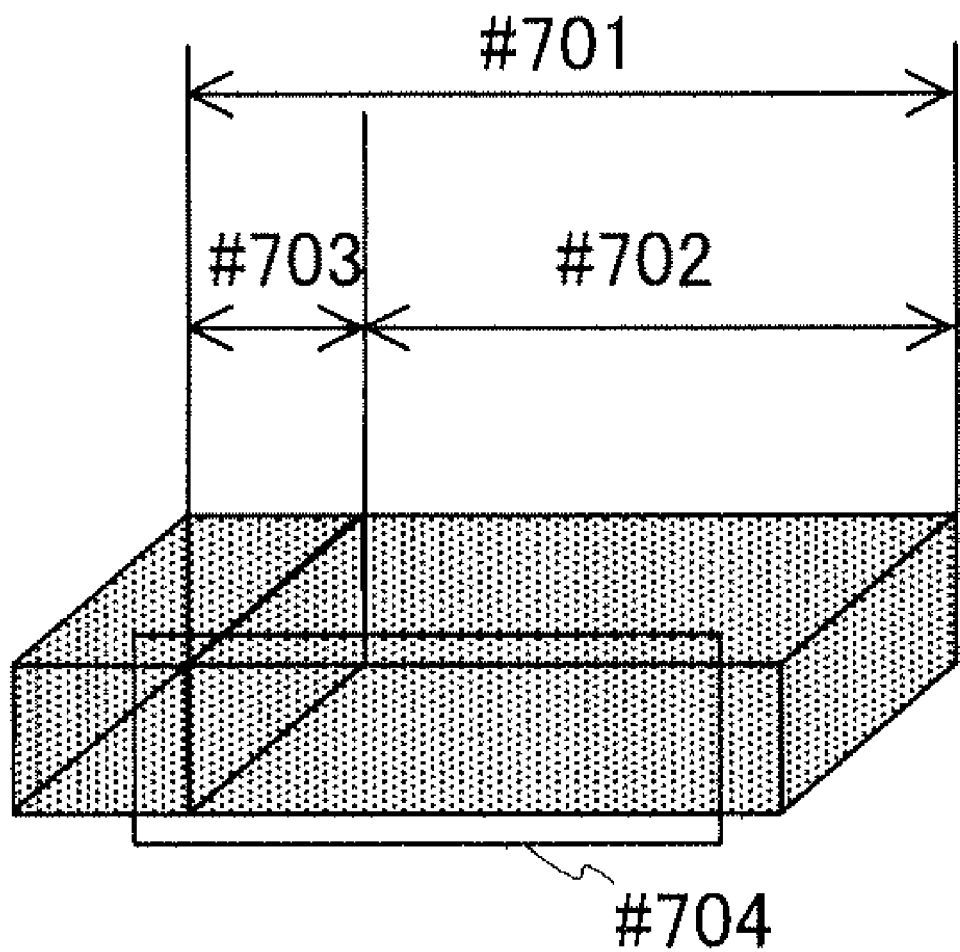
FIG. 7 shows 1 OFDM symbol according to Embodiment 1 of the present invention.

FIG. 7 shows the transmission signal of 1 OFDM symbol #701 transmitted from base station apparatus 200. 1 OFDM symbol #701 is effective symbol length #702 to which GI period #703 is added. GI period #703 is a period where a copy of the rear part of effective symbol length #702 is added to the head of effective symbol length #702.

Figure 8:
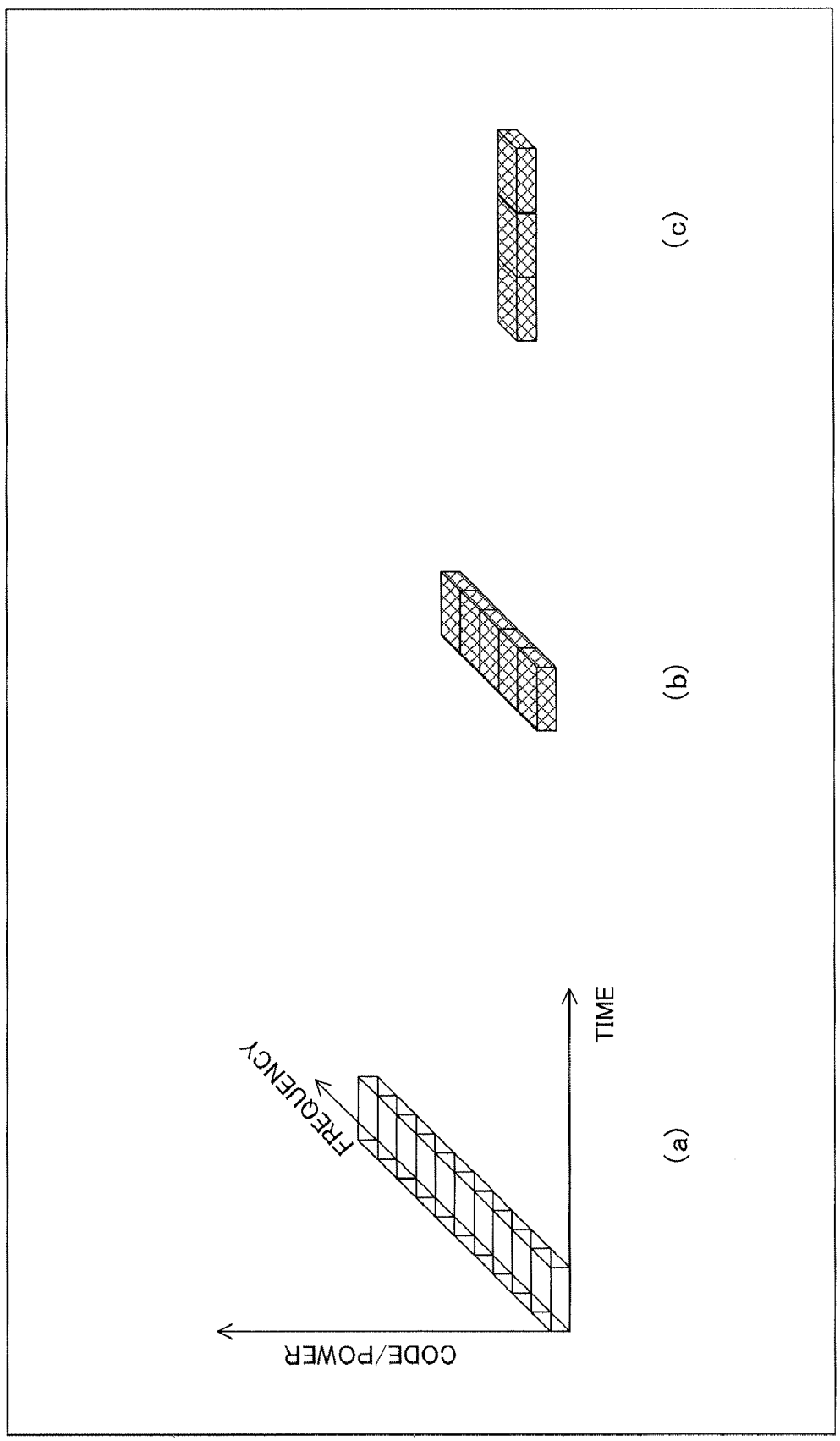
FIG. 8 illustrates the operation of the communication terminal apparatus according to Embodiment 1 of the present invention.

Next, communication terminal apparatus 100 which receives the signal shown in FIG. 8(a) transmitted from base station apparatus 200, A/D-converts the received signal at A/D conversion section 101, corrects the frequency difference caused by a Doppler frequency and the like at multiplier 103 and makes the band filter to pass only a predetermined band. Next, communication terminal apparatus 100 performs FFT processing on the inside of FFT window #704, which is the consecutive sections corresponding to the arbitrary effective symbol length within 1 OFDM symbol of the received signal, at scrambling code reception timing detection circuit 106 and scrambling code identification circuit 107. Communication terminal apparatus 100 detects the reception timings of the pilot signals and the scrambling codes of base station apparatuses 200. When communication terminal apparatus 100 detects the reception timings of the pilot signals and the scrambling codes, it is necessary to select the FFT timing so as not to have interference on the effective symbol section and also necessary to perform FFT at the same frequency as the transmission frequency and for the same effective symbol time as that on the transmitting side. Although any part other than FFT window #704 includes disturbance or interference, no part other than FFT window #704 is used for the FFT calculation in 1 OFDM symbol, and therefore the FFT calculation result is not influenced.

Further, communication terminal apparatus 100 compares the measured frequencies with the reference frequency for the signal inputted from local oscillator 113 at frequency measuring section 108, and detects frequency difference fd which is a difference between the measured frequencies and the frequency of the signal inputted from local oscillator 113.

Next, communication terminal apparatus 100 stores frequency difference fd measured by frequency measuring section 108 as frequency difference information in frequency difference memory 109 per base station apparatus 200, stores the reception timing of the pilot signal detected by scrambling code reception timing detection circuit 106 in scrambling code reception timing memory 110 per base station apparatus 200, and stores the scrambling code detected by scrambling code identification circuit 107 in scrambling code memory 111 per base station apparatus 200.

Next, based on the reception timing of the pilot signal, communication terminal apparatus 100 demodulates the received signal and the scrambling code at demodulation circuit 112. In this case, communication terminal apparatus 100 duplicates and stores the transmission patterns of the pilot signals shown in FIG. 6 at synchronizing base station switch 105. For example, as shown in FIG. 6, synchronizing base station switch 105 duplicates and stores the transmission patterns such that pilot signal #604 of base station apparatus 200-2 is demodulated at time t1 and pilot signal #605 of base station apparatus 200-2 is demodulated at time t2. Based on the stored transmission patterns, synchronizing base station switch 105 then estimates timings at which the signals of the base station apparatuses are demodulated by demodulation circuit 112. At the timings at which the estimated signals of the base station apparatuses are demodulated, synchronizing base station switch 105 controls switching using the switching timing signal, so as to output the reception timings of the pilot signals of base station apparatuses 200 stored in scrambling code reception timing memory 110 and the scrambling codes to be demodulated of base station apparatuses 200 stored in scrambling code memory 111 to demodulation circuit 112. As for the demodulation processing at demodulation circuit 112, demodulation circuit 112 removes the GI period from the received signal, performs the FFT calculation on the received signal and then performs despreading processing using the short-period spreading code and the scrambling code. By this means, the received signal is as shown in FIG. 8(b). Furthermore, demodulation circuit 112 converts the received signal from a parallel data format to a serial data format. By this means, the received signal is as shown in FIG.

8(c). Demodulation circuit 112 then outputs the received signal shown in FIG. 8(c) as the received data.

Figure 9:
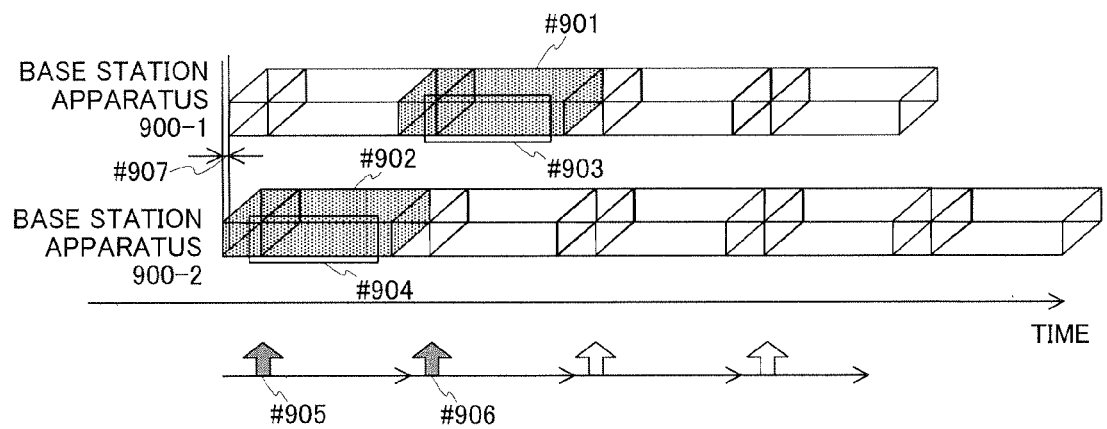
FIG. 9 shows reception timings and detection conditions of pilot signals according to Embodiment 1 of the present invention.
Figure 10:
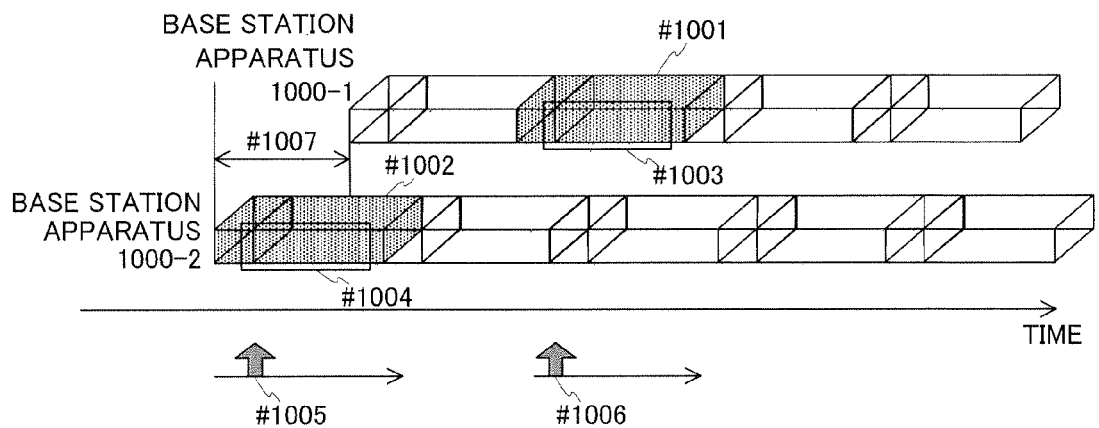
FIG. 10 shows reception timings and detection conditions of pilot signals according to Embodiment 1 of the present invention.

Next, details of the setting of transmission timings of the pilot signals transmitted from the base station apparatuses will be explained using FIGS. 9 and 10. FIGS. 9 and 10 show the reception timings of the pilot signals and the detection states of the pilot signals.

If a difference in transmission timings of the pilot signals between base station apparatuses 200 is set to a time equal to or longer than a 1-OFDM symbol length, which is a minimum resolution, it is possible to prevent the pilot signals of base station apparatuses 200 from overlapping with each other. The case is assumed where the timing difference occurs when the transmission signals of OFDM symbols are transmitted between base station apparatuses 200. According to OFDM where a GI period is added, the data of the GI period, which is any data other than the FFT window, is discarded upon demodulation. Consequently, if the reception timing difference between base station apparatuses 200 is within this GI period, communication terminal apparatus 100 can perform FFT on the effective symbol length of base station apparatuses 200 through time division processing. For example, in FIG. 9, even when 1-OFDM symbol length #901 of the pilot signal of base station apparatus 900-1 overlaps with 1-OFDM symbol length #902 of the pilot signal of base station apparatus 900-2 in the time domain, if FFT window #903 in 1-OFDM symbol length #901 of base station apparatus 900-1 and FFT window #904 in OFDM symbol length #902 of base station apparatus 900-2 are received without overlapping with each other in the time domain, communication terminal apparatus 100 can perform demodulation. By this means, communication terminal apparatus 100 detects pilot signals #905, #906 at reception starting timings of FFT windows #903, #904. In this case, a difference of reception timings #907 between the pilot signal of base station apparatus 900-1 and the pilot signal of base station apparatus 900-2 should be within the GI period.

Further, there is a case where it is difficult for communication terminal apparatus 100 to make the difference of reception timings #907 between the pilot signal of base station apparatus 900-1 and the pilot signal of base station apparatus 900-2 fall within the GI period. In this case, if communication terminal apparatus 100 can receive the pilot signals at a timing difference equal to or longer than 1-OFDM symbol time, communication terminal apparatus 100 can perform FFT on the effective symbol lengths of base station apparatuses 200 through time division processing. For example, in FIG. 10, when a difference of reception timings #1007 between 1-OFDM symbol length #1001 of the pilot signal of base station apparatus 1000-1 and 1-OFDM symbol length #1002 of the pilot signal of base station apparatus 1000-2 is equal to or longer than 1-OFDM symbol time in the time domain, communication terminal apparatus 100 can perform demodulation and thereby detect pilot signals #1005, #1006 at reception starting timings of FFT windows #1003, #1004. That is, if a time difference which is longer than the effective symbol length of a 1-OFDM symbol with respect to a transmission timing of a pilot signal of another station is provided per frame to the transmission timings of the pilot signals at the base station apparatuses, communication terminal apparatus 100 can detect reception timings and scrambling codes. Base station apparatuses 900-1, 900-2, 1000-1 and 1000-2 in FIGS. 9 and 10 have configurations identical to those in FIG. 2.

Next, a more specific method for calculating a synchronization difference between the base station apparatuses at synchronization difference calculation section 115 will be explained. Synchronization difference calculation section 115 obtains a distance between base station apparatuses 200 and communication terminal apparatus 100 using the position information and the positions of the base station apparatuses. Synchronization difference calculation section 115 also obtains radio wave propagation time between base station apparatuses 200 and communication terminal apparatus 100 using the speed of radio waves of (3 e+8)m/sec and the distance between base station apparatuses 200 and communication terminal apparatus 100. Synchronization difference calculation section 115 calculates differences of radio wave propagation times between communication terminal apparatus 100 and base station apparatuses 200 as reference values using the obtained radio wave propagation time. Further, communication terminal apparatus 100 measures the reception timings of the pilot signals of the two base station apparatuses and detects a difference of the measured reception timings between the base station apparatuses. The synchronization difference between the base station apparatuses is then measured from the detected difference of the reception timings between the base station apparatuses and the reference value.

When, for example, the distance between base station apparatus 1 and communication terminal apparatus 100 is 100 m, the distance between base station apparatus 2 and communication terminal apparatus 100 is 500 m and a pilot signal of base station apparatus 2 is transmitted for 1 μs, synchronization difference calculation section 115 obtains a difference of radio wave propagation times as follows. The propagation time of base station apparatus 1 is 100/3 e+8=0.33 μs. The propagation time of base station apparatus 2 is 500/(3 e+8)=1.66 μs Accordingly, if base station apparatus 1 is synchronized with base station apparatus 2, the radio wave propagation time difference must be 1.33 μs. However, when the pilot signal of base station apparatus 2 is detected 1 μs later the pilot signal of base station apparatus 1, it is obvious that the pilot signal of base station apparatus 2 is shifted in a direction of 0.33 μs ahead. Therefore, communication terminal apparatus 100 reports the information that the pilot signal of base station apparatus 2 is 0.33 μs ahead to base station apparatus 2 as synchronization difference information which is error information. Based on the received synchronization difference information, base station apparatus 2 which receives the synchronization difference information delays the transmission timing of the pilot signal by 0.33 μs so as to eliminate an error, and can thereby establish synchronization with base station apparatus 1. By this means, transmission timings can be synchronized between all neighboring base station apparatuses. The measurement of the synchronization difference is performed not only once by communication terminal apparatus 100, but performed a plurality of times by communication terminal apparatus 100 at different places at different times, and communication terminal apparatus 100 calculates the average, thereby improving the detection accuracy of the synchronization difference.

In this way, according to Embodiment 1, the pilot signals can be received from the base station apparatuses at the reception timings without overlapping with each other, so that it is possible to configure demodulation block 121 with a single circuit part and thereby reduce the circuit scale.

Embodiment 2

Figure 11:
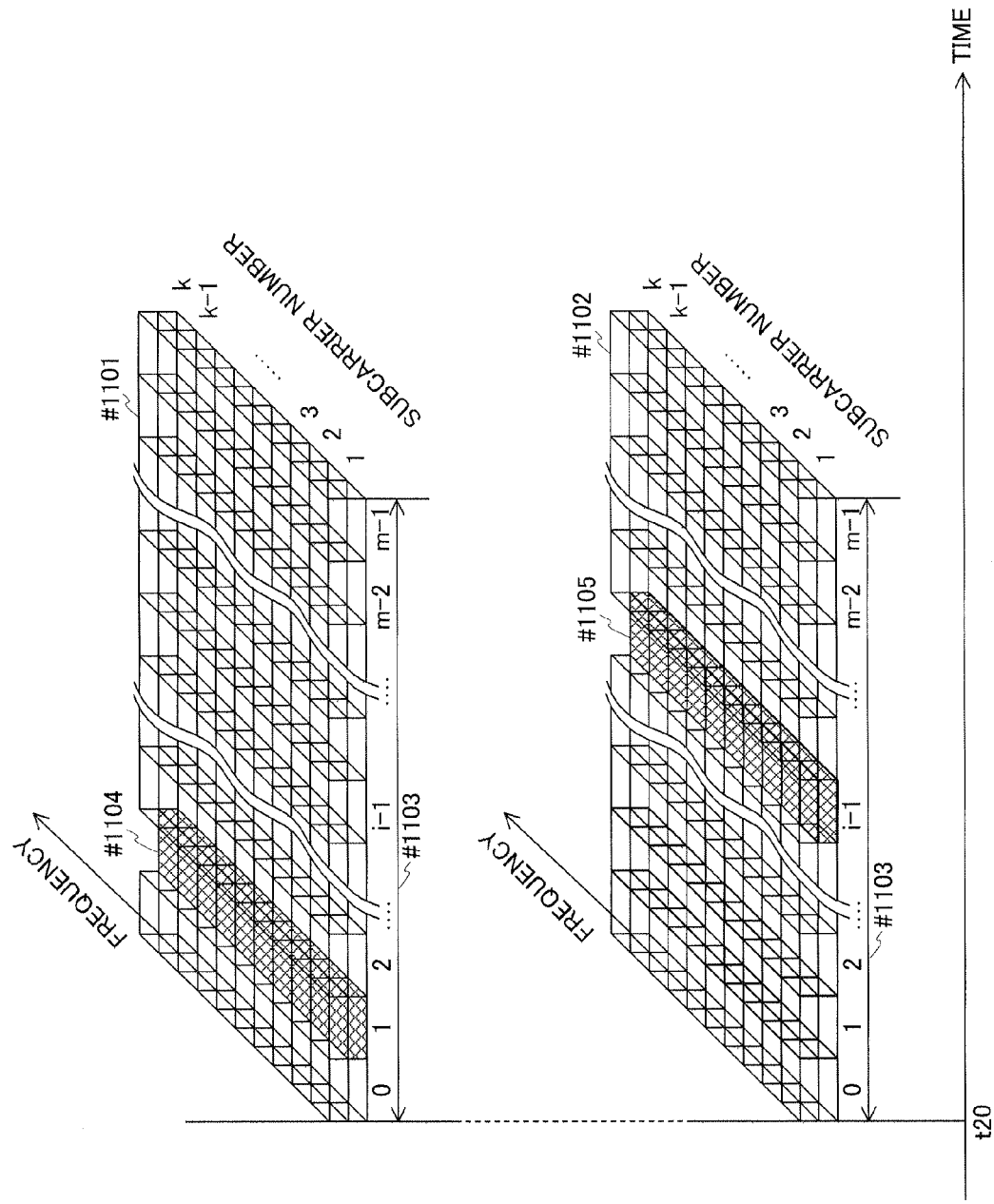
FIG. 11 shows transmission timings of pilot signals according to Embodiment 2 of the present invention.

FIG. 11 shows the transmission timings of the pilot signals according to Embodiment 2 of the present invention. The configuration of the communication terminal apparatus is the same as shown in FIG. 1, and the configuration of the base station apparatus is the same as shown in FIG. 2, and therefore the explanations will be omitted.

Pilot scheduler section 204 stores symbols where pilot signals of another base station apparatus are inserted in the frames. Pilot scheduler section 204 sets transmission timings of the pilot signals of the base station so that the pilot signals are inserted in different symbols from the symbols where the stored pilot signals of another base station apparatus are inserted. Pilot scheduler section 204 then instructs multiplexing section 205 to multiplex the transmission data and the pilot signals at the set transmission timings of the pilot signals. Further, based on the synchronization difference information inputted from demodulation section 215, pilot scheduler section 204 corrects the synchronization difference of the pilot signals.

In FIG. 11, the horizontal axis shows a time domain, and the vertical axis shows a frequency domain. In FIG. 11, transmission signal #1101 is transmitted from base station apparatus 200-1, and transmission signal #1102 is transmitted from base station apparatus 200-2. In transmission signal #1101, pilot signal #1104 is inserted in the second symbol from the leading symbol of 1 radio frame #1103, and, in transmission signal #1102, pilot signal #1105 is inserted in the (i−1)th (0≦i≦m−1) symbol from the leading symbol of 1 radio frame #1103. Furthermore, 1 radio frame #1103 is comprised of m symbols from "0" to "m−1", and symbol 0 is a leading symbol. Furthermore, in transmission signals #1101 and #1102, k subcarriers which have subcarrier numbers from "1" to "k" are arranged in the frequency domain.

Pilot scheduler sections 204 of base station apparatuses 200-1 and 200-2 simultaneously start transmission of the transmission signals at time t20. At that time, pilot signals are inserted in different symbols, and therefore the pilot signals of base station apparatuses 200-1 and 200-2 never overlap with each other in the time domain.

In this way, according to Embodiment 2, pilot signals of the base station apparatuses can be received at reception timings without overlapping with each other, so that it is possible to configure demodulation block 121 with a single circuit part and thereby reduce the circuit scale. Furthermore, according to this Embodiment 2, radio frames of a plurality of base station apparatuses are transmitted at the same timing, so that the communication terminal apparatus can transmit an ACK or retransmission request to the base station apparatuses at the same timing, and the communication terminal apparatus can reduce a processing load due to retransmission processing.

Embodiment 3

Figure 12:
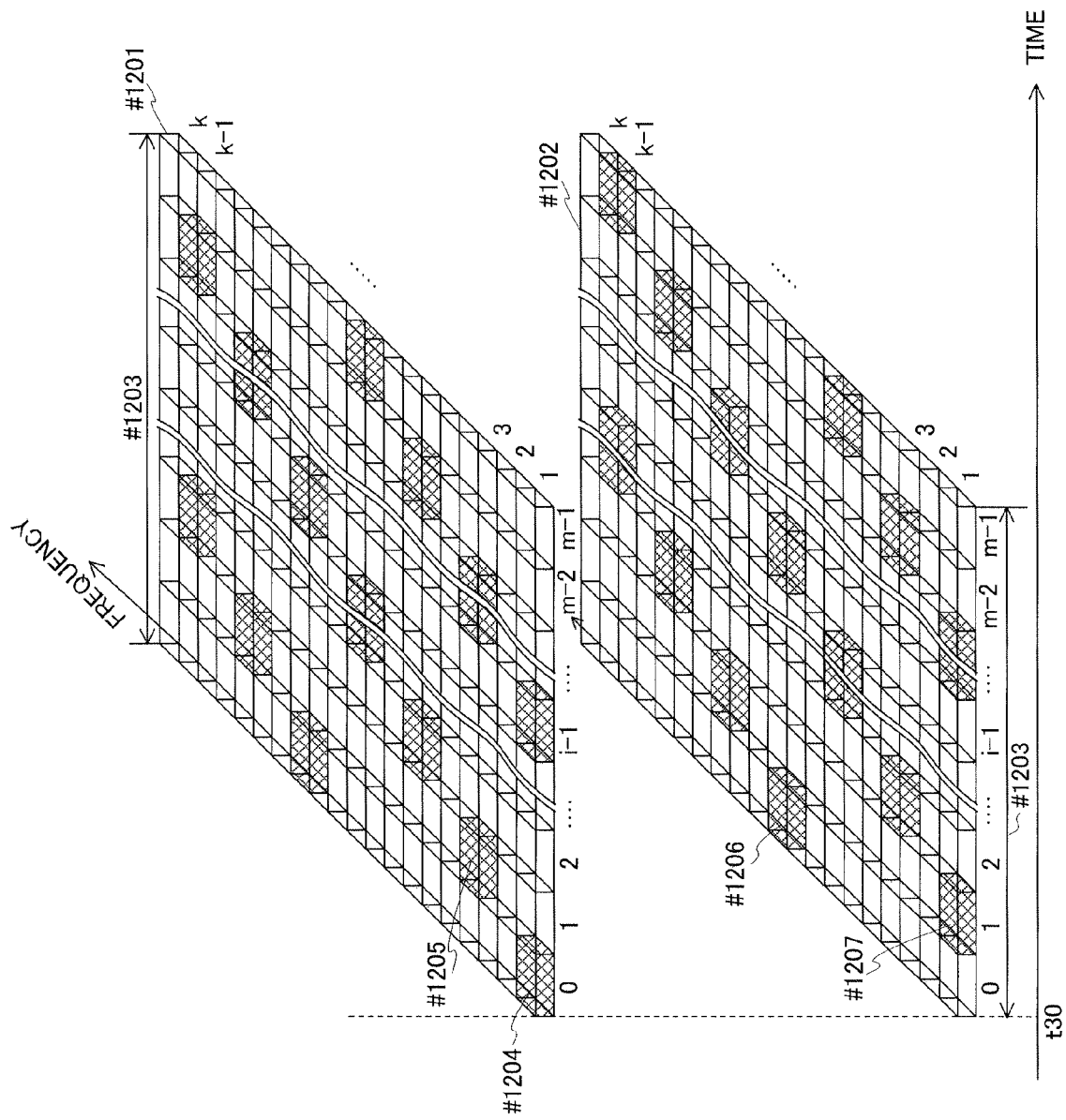
FIG. 12 shows transmission timings of pilot signals according to Embodiment 3 of the present invention.
Figure 13:
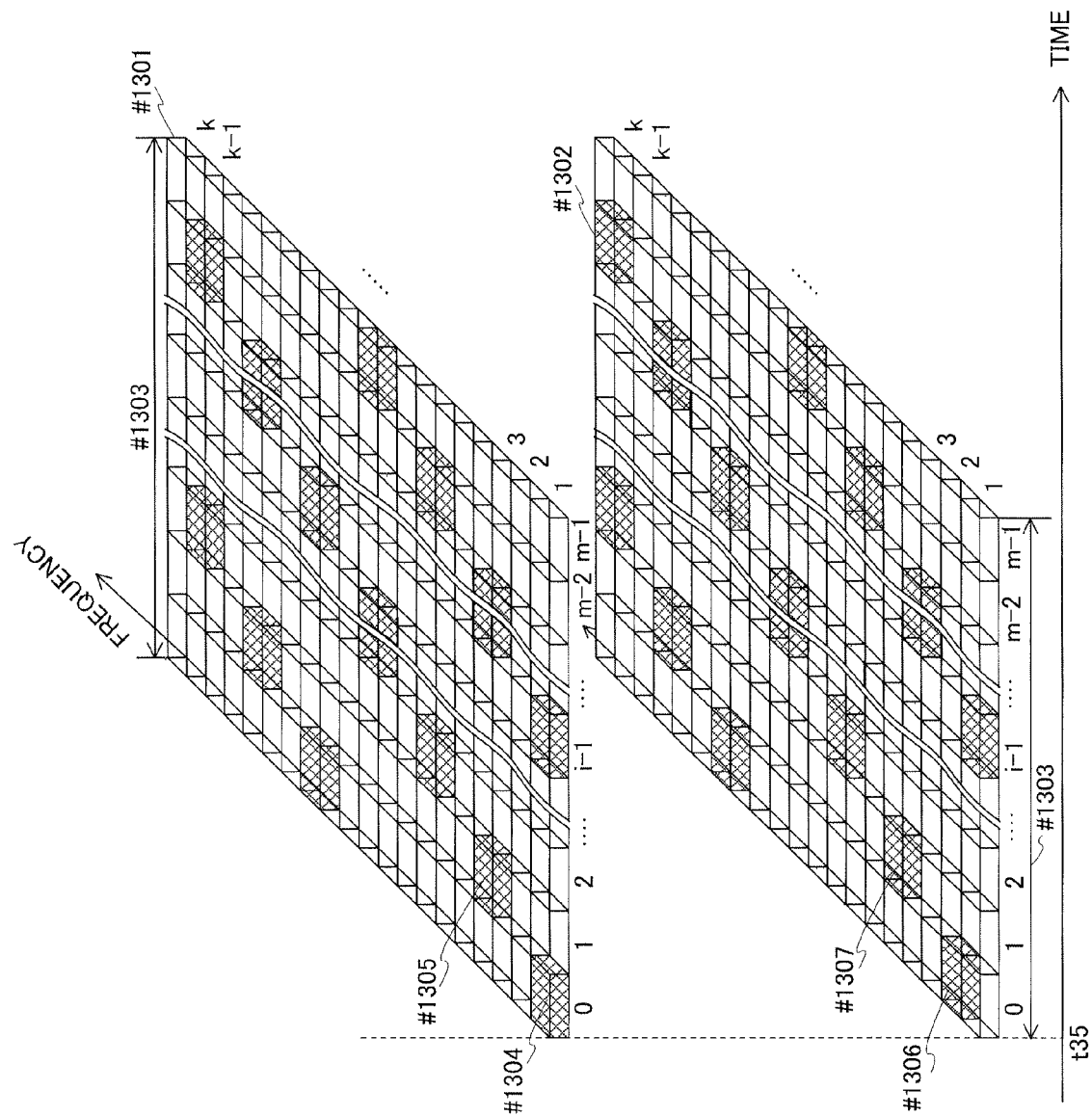
FIG. 13 shows transmission timings of pilot signals according to Embodiment 3 of the present invention.

FIGS. 12 and 13 show transmission timings of pilot signals according to Embodiment 3 of the present invention. The configuration of the communication terminal apparatus is the same as shown in FIG. 1, and the configuration of the base station apparatus is the same as shown in FIG. 2, and therefore the explanations will be omitted.

Pilot scheduler section 204 controls the positions where the pilot signals are inserted out of positions specified based on subcarrier numbers 1 to k and the number of symbols from the head of each frame. In addition, pilot scheduler section 204 stores positions specified based on subcarrier numbers 1 to k and the number of symbols from the head of each frame of another base station apparatus and sets transmission timings of the pilot signals of the base station so as to insert pilot signals at different positions from positions where the stored pilot signals of another base station apparatus are inserted. Pilot scheduler section 204 then instructs multiplexing section 205 to insert the pilot signals at the set positions and multiplex the transmission data and the pilot signals. Further, based on the synchronization difference information inputted from demodulation section 215, pilot scheduler section 204 corrects a synchronization difference of the pilot signals.

In FIGS. 12 and 13, the horizontal axis shows a time domain, and the vertical axis shows a frequency domain. In FIG. 12, transmission signal #1201 is transmitted from base station apparatus 200-1 and transmission signal #1202 is transmitted from base station apparatus 200-2. Transmission signal #1202 shifts the pilot signals and the transmission data that are inserted at the positions specified based on the subcarrier numbers and the number of symbols from the head of the frame of transmission signal #1201, by one symbol in the time domain. In other words, pilot signal #1204 is inserted in subcarrier number 1 or the like of the leading symbol of 1 radio frame #1203 in transmission signal #1201, and pilot signal #1205 is inserted in subcarrier number 3 or the like of the second symbol from the leading symbol. Further, pilot signal #1206 is inserted in subcarrier number 10 or the like of the leading symbol of 1 radio frame #1203 in transmission signal #1202, and pilot signal #1207 is inserted in subcarrier number 1 or the like of the second symbol from the leading symbol. In this way, the control is performed so that the pilot signals are inserted in different subcarrier numbers on a per symbol basis. Furthermore, 1 radio frame #1203 is comprised of m symbols from "0" to "m−1", and symbol 0 is a leading symbol. Furthermore, in transmission signals #1201 and #1202, k subcarriers which have subcarrier numbers from "1" to "k" are arranged in the frequency domain.

Pilot scheduler sections 204 of base station apparatuses 200-1 and 200-2 simultaneously start transmission of transmission signals at time t30. At that time, the positions which are specified based on subcarrier numbers 1 to k and the number of symbols from the head of the frame, and where the pilot signals are inserted, are different between base station apparatus 200-1 and base station apparatus 200-2. For that reason, pilot signals of base station apparatuses 200-1 and 200-2 never overlap with each other at the positions specified based on the subcarrier numbers and the number of symbols from the head of the frame.

In FIG. 13, transmission signal #1301 is transmitted from base station apparatus 200-1, and transmission signal #1302 is transmitted from base station apparatus 200-2. Transmission signal #1302 shifts the pilot signals and the transmission data inserted at the positions specified based on the subcarrier numbers and the number of symbols from the head of the frame of transmission signal #1301, by one subcarrier number in the frequency domain. That is, pilot signal #1304 is inserted in subcarrier number 1 or the like of the leading symbol of radio frame #1303, and pilot signal #1305 is inserted in subcarrier number 3 or the like of the second symbol from the leading symbol in transmission signal #1301. Further, pilot signal #1306 is inserted in subcarrier number 2 or the like of the leading symbol of 1 radio frame #1303, and pilot signal #1307 is inserted in subcarrier number 4 or the like of the second symbol from the leading symbol in transmission signal #1302. In this way, control is performed so that the pilot signals are inserted to different subcarrier numbers on a per symbol basis. Furthermore, 1 radio frame #1303 is comprised of m symbols from "0" to "m−1", and symbol 0 is a leading symbol. Further, in transmission signals #1301 and #1302, k subcarriers which have subcarrier numbers from "1" to "k" are arranged in the frequency domain.

Pilot scheduler sections 204 of base station apparatuses 200-1 and 200-2 simultaneously start transmission of the transmission signals at time t35. The positions which are specified based on subcarrier numbers 1 to k and the number of symbols from the head of the frame, and where pilot signals are inserted are different, so that pilot signals of base station apparatuses 200-1 and 200-2 never overlap with each other at the positions specified based on the subcarrier numbers and the number of symbols from the head of the frame.

In this way, according to Embodiment 3, the pilot signals of the base station apparatuses can be received at the reception timings which do not overlap with each other, so that it is possible to configure demodulation block 121 with a single circuit part and thereby reduce the circuit scale. Further, according to Embodiment 3, the radio frames of a plurality of the base station apparatuses are transmitted at the same timing, so that the communication terminal apparatus can transmit an ACK or retransmission request to the base station apparatuses at the same timing and thereby reduce a processing load due to retransmission processing.

Embodiment 4

Figure 14:
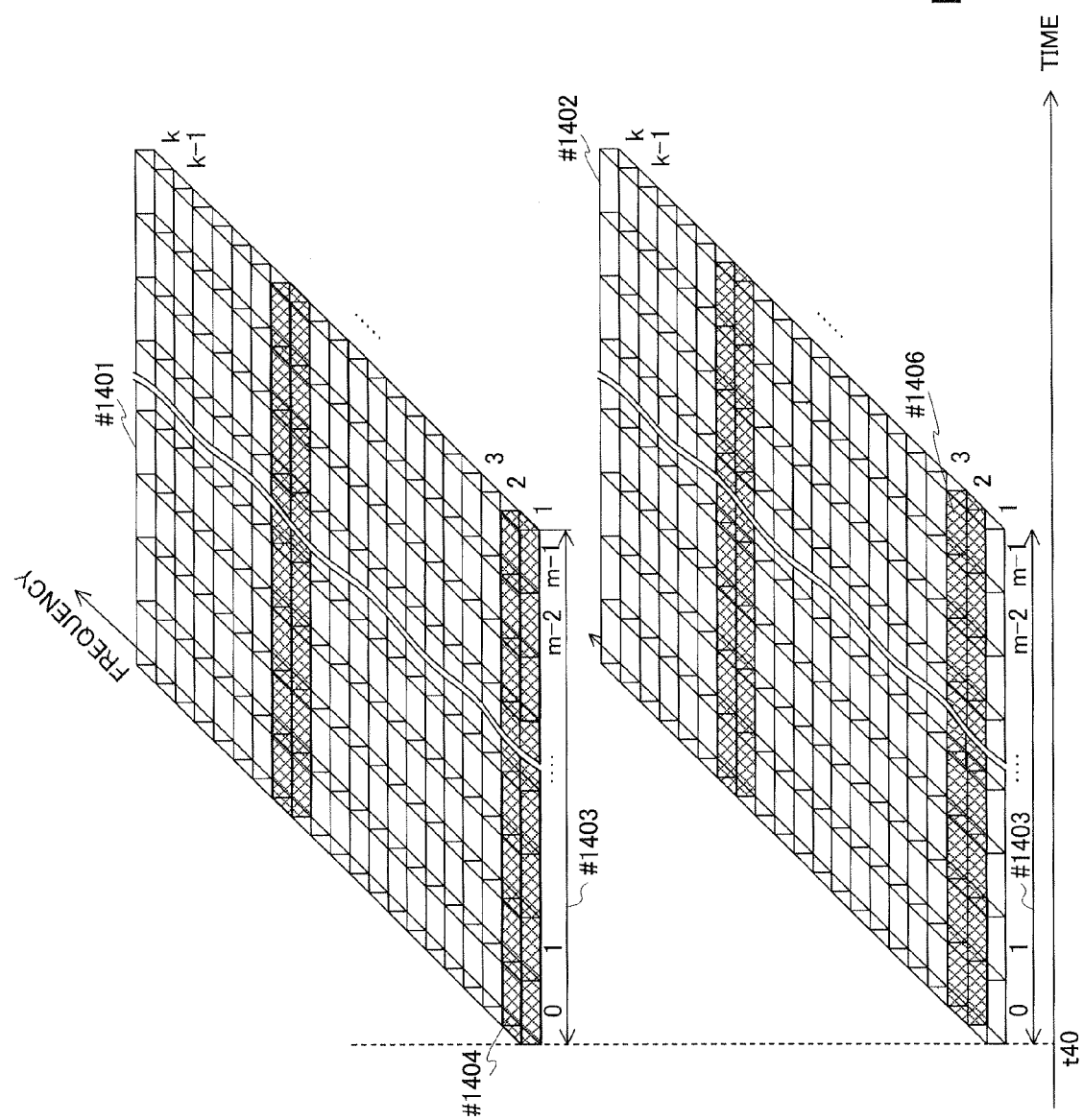
FIG. 14 shows transmission timings of pilot signals according to Embodiment 4 of the present invention.

FIG. 14 shows the transmission timings of pilot signals according to Embodiment 4 of the present invention. The configuration of the communication terminal apparatus is the same as shown in FIG. 1, and the configuration of the base station apparatus is the same as shown in FIG. 2, and therefore the explanations will be omitted.

Pilot scheduler section 204 stores subcarrier numbers where the pilot signals in the frames of another base station apparatus are inserted and sets the transmission timings of the pilot signals of the base station so as to insert the pilot signals in different subcarrier numbers from subcarrier numbers where stored pilot signals of another base station apparatus are inserted. Pilot scheduler section 204 then instructs multiplexing section 205 to multiplex the transmission data and the pilot signals by inserting the pilot signals to the subcarriers of the set subcarrier numbers. Further, based on the synchronization difference information inputted from demodulation section 215, pilot scheduler section 204 corrects a synchronization difference of the pilot signals.

In FIG. 14, the horizontal axis shows a time domain, and the vertical axis shows a frequency domain. In FIG. 14, transmission signal #1401 is transmitted from base station apparatus 200-1, and transmission signal #1402 is transmitted from base station apparatus 200-2. Pilot signal #1404 is inserted in subcarrier number 1 or the like of 1 radio frame #1403 in transmission signal #1401, and pilot signal #1406 is inserted in subcarrier number 2 or the like of 1 radio frame #1403 in transmission signal #1402. Furthermore, 1 radio frame #1403 is comprised of m symbols from "0" to "m−1", and symbol 0 is a leading symbol. Furthermore, in transmission signals #1401 and #1402, k subcarriers which have subcarrier numbers from "1" to "k" are arranged in the frequency domain.

Pilot scheduler sections 204 of base station apparatuses 200-1 and 200-2 simultaneously start transmission of the transmission signals at time t40. At that time, subcarrier numbers where pilot signals are inserted are different between the base station apparatuses, and pilot signals of base station apparatus 200-1 never overlap with pilot signals of base station apparatus 200-2 in the frequency domain.

In this way, according to Embodiment 4, the pilot signals of the base station apparatuses can be received at reception timings without overlapping with each other, so that it is possible to configure demodulation block 121 with a single circuit part and thereby reduce the circuit scale. Further, according to embodiment 4, the radio frames of a plurality of the base station apparatuses are transmitted at the same timing, so that a communication terminal apparatus can transmit an ACK or retransmission request to the base station apparatuses at the same timing.

Further, scrambling code reception timing memory 110 and scrambling code memory 111 are provided separately in above-described Embodiments 1 to 4, but the present invention is not limited to this, and scrambling code reception timing memory 110 and scrambling code memory 111 may also be provided in one memory.

The present application is based on Japanese Patent Application No. 2005-97988, filed on Mar. 30, 2005, entire content of which is expressly incorporated by reference herein.

Industrial Applicability

The communication terminal apparatus, base station apparatus and reception method according to the present invention are suitable for use particularly in a 1-frequency iteration cellular system using OFCDM in downlink.

The invention claimed is:

1. A communication terminal apparatus comprising:
a reception section that receives signals which are transmitted from a plurality of base station apparatuses and multiplied by respective scrambling codes specific to each base station apparatus, and receives, at different timings, pilot signals included in the signals transmitted from the base station apparatuses at timings not overlapping with each other;
a reception synchronizing section that detects reception timings of the pilot signals of the base station apparatuses received by the reception section at the different timings and the scrambling codes;
a storage section that stores the reception timings and the scrambling codes detected at the reception synchronizing section per base station apparatus;
a demodulation section that performs despreading processing on the signals of the base station apparatuses received by the reception section based on the reception timings and the scrambling codes stored in the storage section and then demodulates the despread signals;
a switching section that estimates timings at which the signals of the base station apparatuses received by the reception section are to be subjected to the despreading processing and selects reception timings and scrambling codes of the base station apparatuses to be subjected to the despreading processing from the detected reception timings and the detected scrambling codes stored in the storage section such that the selected reception timings and the selected scrambling codes are outputted to the demodulation section at the estimated timings at which the demodulation section performs the despreading processing on the signals of the base station apparatuses received by the reception section;
a position information obtaining section that obtains position information which is information of a position of the communication terminal apparatus;
a synchronization difference calculation section that calculates an error of a difference of the reception timings of the pilot signals between the base station apparatuses with respect to a reference value based on a difference of the reception timings between the base station apparatuses detected by the reception synchronizing section, the position information obtained by the position information obtaining section, prestored information of positions of the base station apparatuses and speed of radio waves; and
a reporting section that reports synchronization difference information which is information of the error calculated by the synchronization difference calculation section to the base station apparatuses.

2. A communication method comprising:

multiplying signals including pilot signals by respective scrambling codes specific to each of a plurality of base station apparatuses;

setting transmission timings of the pilot signals so that the pilot signals transmitted from the base station apparatuses are transmitted at timings at which the pilot signals do not overlap with each other;

transmitting from the base station apparatuses the signals including the pilot signals multiplied by the scrambling codes so that the pilot signals are transmitted at the set transmission timings;

receiving at a communication terminal apparatus the signals including the pilot signals and receiving the pilot signals transmitted from the base station apparatuses at different timings;

detecting reception timings of the pilot signals received at the different timings and the scrambling codes per base station apparatus;

storing the detected reception timings and the scrambling codes per base station apparatus;

estimating timings at which the received signals of the base station apparatuses are to be subjected to despreading processing;

selecting reception timings and a scrambling code of the base station apparatus to be demodulated at the estimated timings out of the stored reception timings and the stored scrambling codes;

performing the despreading processing at the estimated timings on the signals including the received pilot signals based on the selected reception timings and the selected scrambling code per base station apparatus and then demodulating the signals;

obtaining position infoi ination which is information of a position of the communication terminal apparatus;

calculating an error of a difference of the reception timings of the pilot signals between the base station apparatuses with respect to a reference value based on a difference of the reception timings between the base station apparatuses detected by the reception timings detecting step, the position information obtained by the position information obtaining step, prestored information of positions of the base station apparatuses and speed of radio waves; and reporting synchronization difference information which is information of the error calculated by the error calculating step to the base station apparatuses.

* * * * *